(12) United States Patent
Boutaghou

(10) Patent No.: US 7,203,033 B2
(45) Date of Patent: Apr. 10, 2007

(54) HEAD GIMBAL ASSEMBLY WITH AN INTEGRATED MECHANICAL AND ELECTRICAL ATTACHMENT AND A STIFF PLATE

(75) Inventor: Zine-Eddine Boutaghou, North Oaks, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 186 days.

(21) Appl. No.: 10/389,864

(22) Filed: Mar. 17, 2003

(65) Prior Publication Data

US 2004/0066582 A1 Apr. 8, 2004

Related U.S. Application Data

(60) Provisional application No. 60/415,492, filed on Oct. 2, 2002.

(51) Int. Cl.
G11B 21/16 (2006.01)
G11B 5/48 (2006.01)

(52) U.S. Cl. ............... 360/245.8; 360/244.5; 360/244.8

(58) Field of Classification Search ............ 360/245.8, 360/245.9, 246, 265.9, 264.2, 244.3, 244.5, 360/245.2, 245.5, 244.8
See application file for complete search history.

(56) References Cited

U.S. PATENT DOCUMENTS

| 4,651,242 A | 3/1987 | Hirano et al. ............ 360/103 |
| 4,807,054 A | 2/1989 | Sorensen et al. ........ 360/104 |
| 5,201,458 A | 4/1993 | Hagen .................... 228/199 |
| 5,612,840 A * | 3/1997 | Hiraoka et al. ........ 360/245.9 |
| 5,663,854 A | 9/1997 | Grill et al. .............. 360/104 |
| 5,781,380 A * | 7/1998 | Berding et al. ......... 360/264.2 |
| 5,805,382 A * | 9/1998 | Lee et al. ............... 360/245.8 |
| 5,825,590 A * | 10/1998 | Ohwe .................... 360/244.8 |
| 5,844,750 A | 12/1998 | Takaike |
| 5,963,397 A * | 10/1999 | Grill et al. .............. 360/244.8 |
| 5,991,123 A * | 11/1999 | Casey ................... 360/264.2 |
| 6,031,693 A | 2/2000 | Takahashi et al. ......... 360/114 |
| 6,098,271 A * | 8/2000 | Yamamoto et al. ...... 360/97.01 |
| 6,108,174 A | 8/2000 | Adams .................. 360/266.1 |
| 6,215,627 B1 | 4/2001 | Resh et al. ............ 360/245.6 |
| 6,229,673 B1 * | 5/2001 | Shinohara et al. ....... 360/244.3 |
| 6,522,505 B1 * | 2/2003 | Ohwe et al. ............ 360/245.5 |
| 6,700,745 B2 * | 3/2004 | Shiraishi .............. 360/244.3 |
| 6,797,888 B2 * | 9/2004 | Ookawa et al. ........... 174/255 |
| 6,865,058 B2 * | 3/2005 | Kube et al. ............. 360/244.5 |

FOREIGN PATENT DOCUMENTS

| JP | 07262540 A | 10/1995 |
| JP | 2000173035 A | 6/2000 |

* cited by examiner

*Primary Examiner*—Craig A. Renner
(74) *Attorney, Agent, or Firm*—Kinney & Lange, P.A.

(57) ABSTRACT

A low cost, flex head gimbal assembly has a substrate with an attachment region, a flexure region and an integrated gimbal. The flex head gimbal assembly is electrically and mechanically connected to an actuator arm via solder bumps in the attachment region. A stiff plate is attached to the substrate between the attachment region and the flexure region. A flex cable and electrical interconnections extend from the attachment region across the flexure region to the gimbal. Electrical leads extend from the solder bumps to the flex cable. The substrate is bent at the stiff plate to achieve the desired z-height and to impart the pre-load to the assembly.

10 Claims, 4 Drawing Sheets

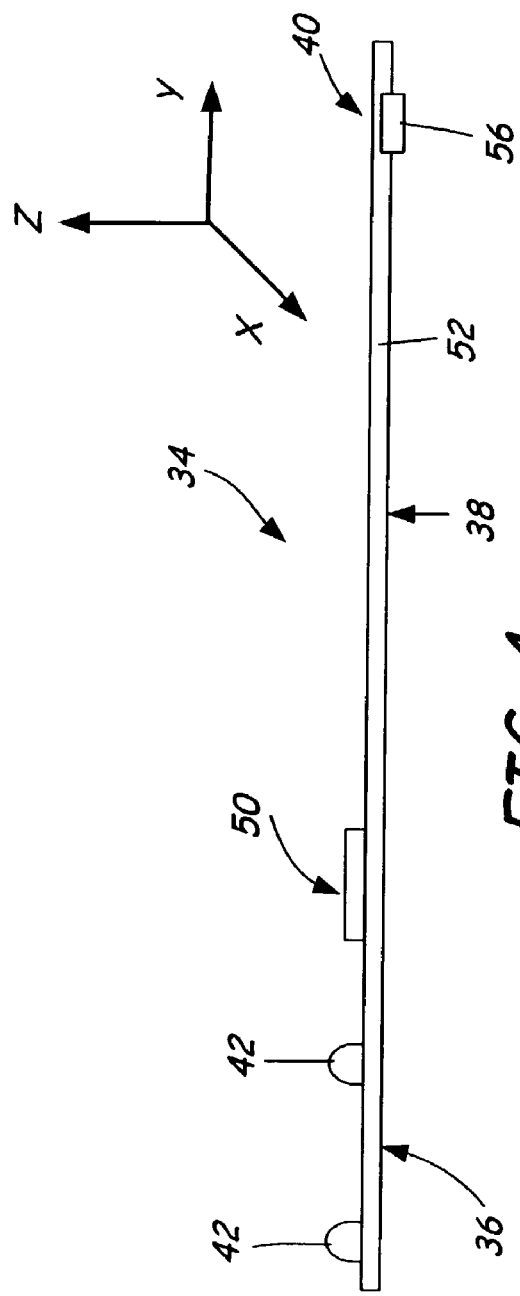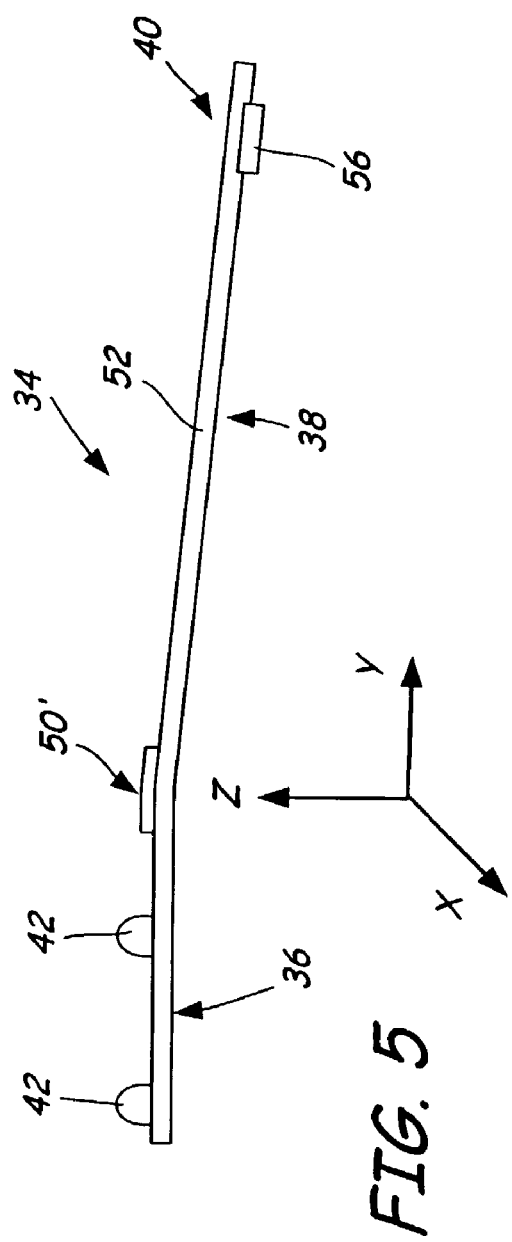

HEAD GIMBAL ASSEMBLY WITH AN INTEGRATED MECHANICAL AND ELECTRICAL ATTACHMENT AND A STIFF PLATE

CROSS-REFERENCE TO RELATED APPLICATION(S)

This application claims priority from provisional patent application Ser. No. 60/415,492 filed on Oct. 2, 2002, and entitled "LOW COST HEAD GIMBAL ASSEMBLY."

BACKGROUND OF THE INVENTION

The present invention relates to a low cost head gimbal assembly for a multiple disc magnetic disc drive. More specifically, the present invention relates to a head gimbal assembly with an integrated electrical/mechanical attachment to the arm assembly and with a stiff plate on the flexure to set the system attitude.

Generally, a magnetic disc drive includes a magnetic disc and a magnetic read/write head. When the disc rotates, the magnetic read/write head reads and writes magnetic signals on circular tracks on the disc. The read/write head is typically mounted on a slider, which is mounted to a suspension or load beam. The load beam biases the slider toward the surface of the rotating disc. This biasing is sometimes referred to as "pre-loading". The load beam is attached to an actuator arm of an actuator, which moves the read/write head over the spinning disc during operation.

In a high capacity disc drive, multiple double-sided discs, arranged vertically in a stack, can be read from and written to by multiple read/write heads, each attached to a slider that is mounted to a load beam. In a high capacity disc drive, a single actuator arm typically controls a pair of load beams, and each pair of load beams are arranged between adjacent discs in the stack, such that the first read/write head in the pair is biased toward the bottom of one disc while the second read/write head is biased toward the top of the other disc.

A typical prior art suspension is made from metal that is bent to bias the slider toward the disc surface. The pre-load bend region imparts z-height stiffness to the assembly. The suspension is typically attached to the arm assembly by swaging. In other words, during the assembly process, a ball and cross is used to plastically deform the suspension material into the arm at the attachment area. Finally, the electrical interconnections formed on the suspension are attached by a separate process via wires to the electrical connections on the actuator arm to complete the assembly process.

As the disc drive industry advances technologically, each element of the disc drive assembly is becoming increasingly integrated, and space and assembly costs are at a premium. Increasingly, circuitry is integrated with the actuator arms and other mechanical elements of the disc drive. It is desirable to integrate the mechanical connections with the electrical connections to provide a simpler, less expensive head gimbal assembly.

BRIEF SUMMARY OF THE INVENTION

The low-cost head gimbal assembly has a substrate with an attachment region, a flexure region and a gimbal. The substrate has a flex cable and electrical interconnections defined on a surface, which extend from the attachment region across the flexure region and onto the gimbal of the substrate. Solder bumps disposed in the attachment region both mechanically and electrically connect the substrate to the actuator arm. Electrical leads electrically connect the solder bumps to the flex cable. A stiff plate is deposited or bonded to the substrate between the attachment region and the flexure region. The stiff plate is bent to achieve the desired z-height and to impart the pre-load to the assembly.

BRIEF DESCRIPTION OF THE DRAWINGS

FIG. 4 is a side view of the flex head gimbal assembly of the present invention prior to z-height formation.

FIG. 5 is a side view of the flex head gimbal assembly of the present invention after z-height formation.

DETAILED DESCRIPTION

Figure 1:
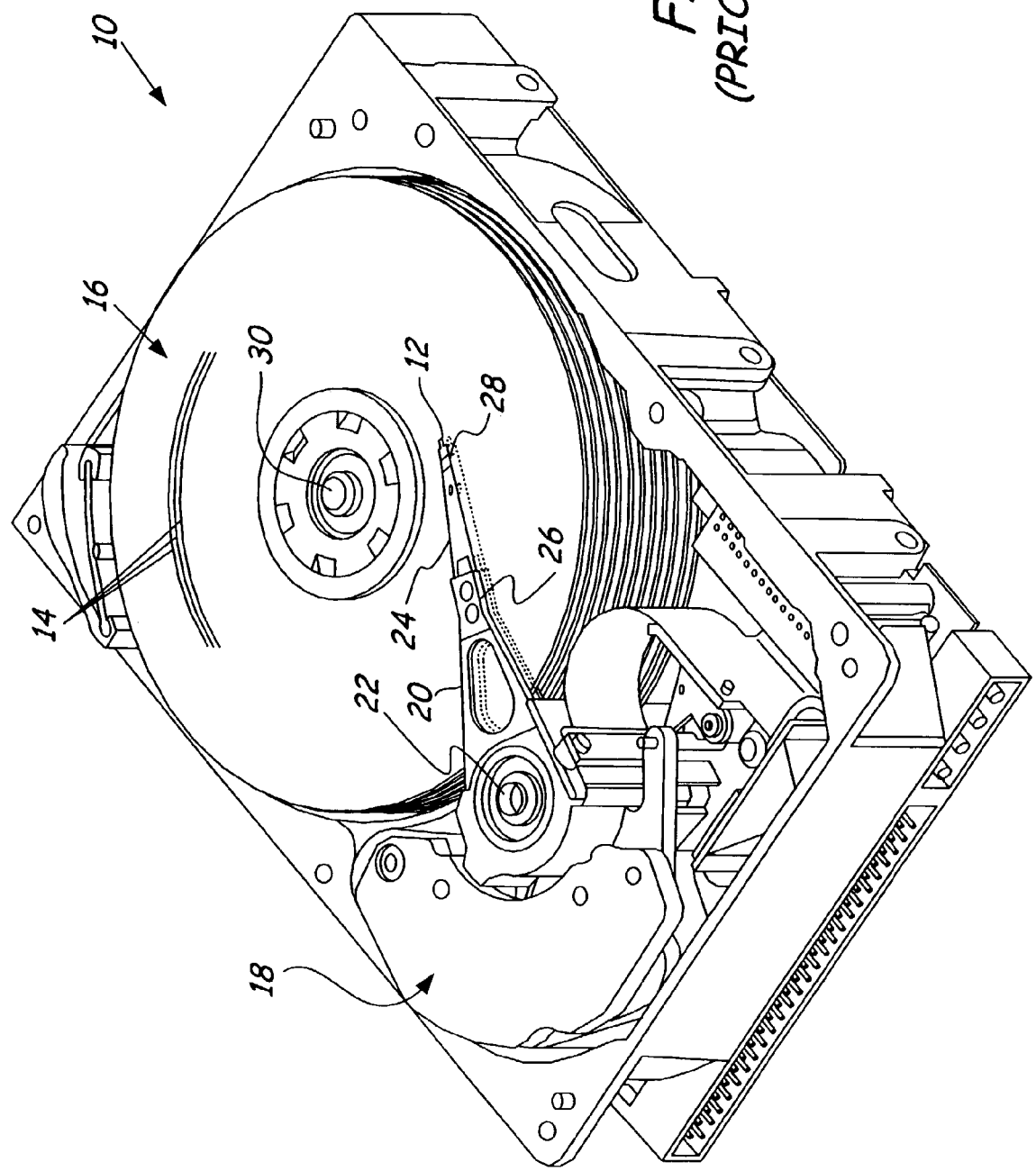
FIG. 1 is a perspective view of a disc drive including an actuator assembly and a load beam of the prior art.

FIG. 1 is a perspective view of a prior art disc drive 10 including an actuation assembly for positioning a slider 12 over a track 14 of a disc 16. Disc drive 10 includes a voice coil motor (VCM) 18 arranged to rotate an actuator arm 20 on a spindle around an axis 22. A load beam 24 is connected to actuator arm 20 at a head mounting block 26. A gimbal 28 is connected to an end of load beam 24 and slider 12 is attached to gimbal 28. Slider 12 carries a transducing head (not shown in FIG. 1) for reading and/or writing data on concentric tracks 14 of disc 16. Disc 16 rotates around an axis 30, producing a hydrodynamic layer of air that keeps the slider 12 aloft a small distance above the surface of disc 16. FIG. 1 shows a high capacity disc driving having multiple rotating discs 16. The disc drive has an upper and lower actuation assembly for each disc 16, with the lower actuation assembly being shown in phantom.

Figure 2:
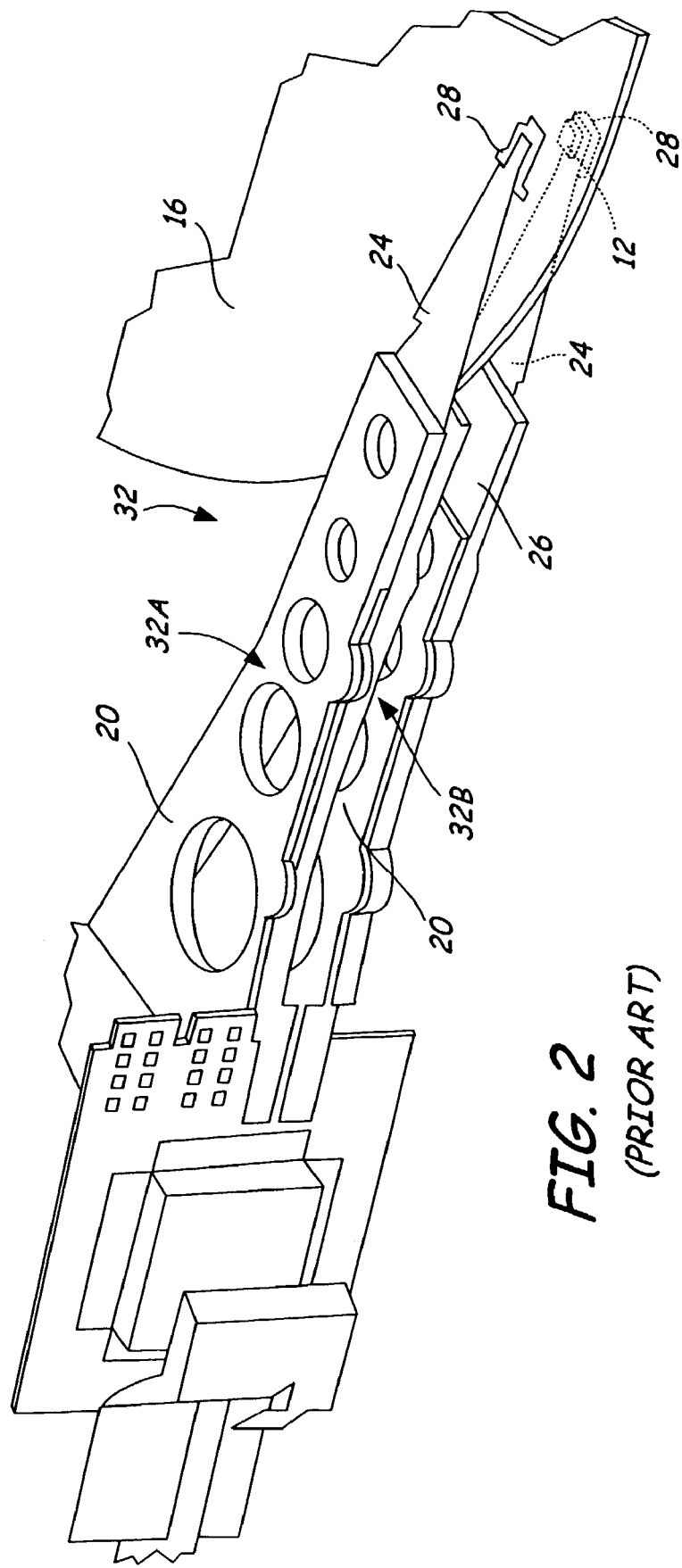
FIG. 2 is a perspective view of an actuation assembly in the prior art.

FIG. 2 is a perspective view of a prior art actuation assembly 32 for positioning slider 12 over track 14 of disc 16. Actuation assembly 32 includes an upper assembly 32A and a lower assembly 32B that are identical. Both the upper assembly 32A and the lower assembly 32B have actuator arm 20 with load beam 24 connected to the actuator arm 20 at head mounting block 26. Gimbal 28 is connected to an end of load beam 24, and slider 12 is attached to gimbal 28. Slider 12 carried by upper assembly 32A reads and writes data from an upper surface of disc 16. Slider 12 located on lower assembly 32B reads and writes data from the lower surface of disc 16.

Figure 3:
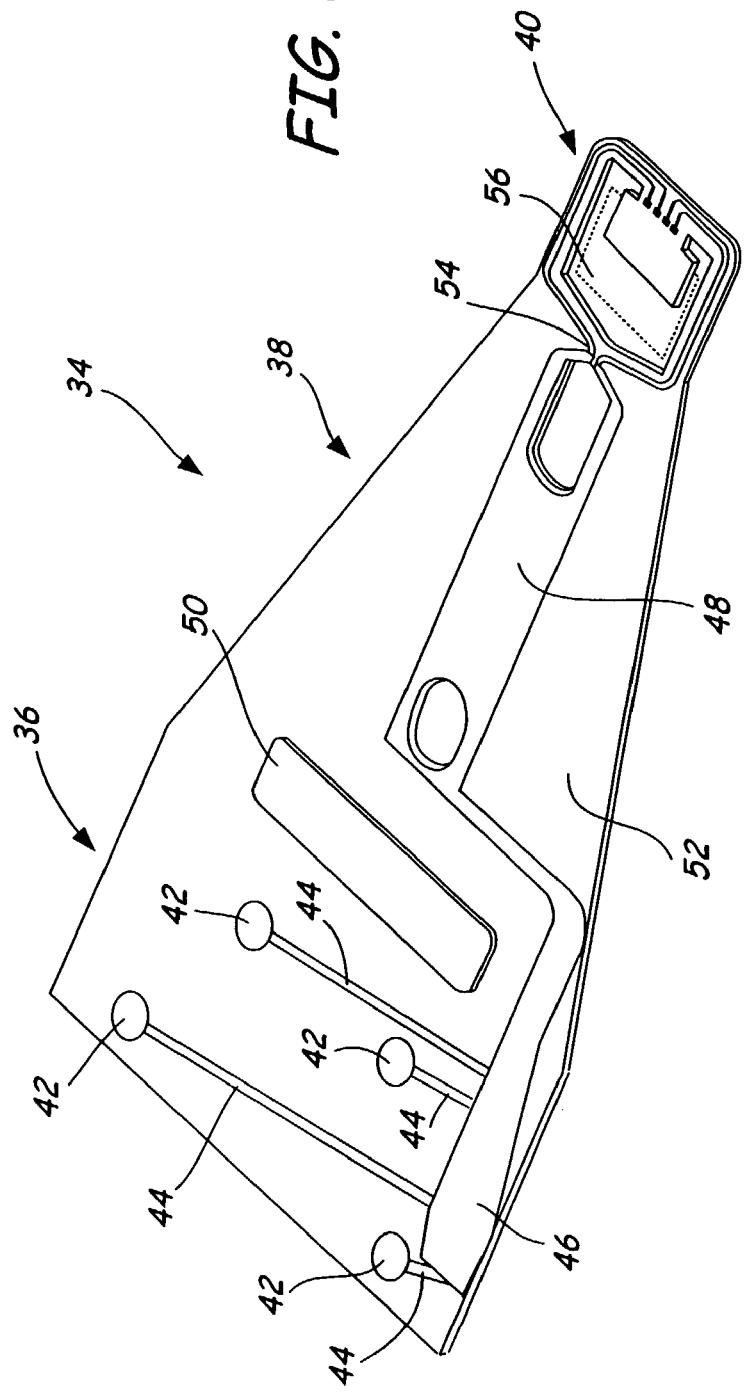
FIG. 3 is a perspective view of the load beam of the present invention.

FIG. 3 is a perspective view of the flex head gimbal assembly 34 of the present invention for linking the slider 12 to the actuator arm 20 (in FIGS. 1 and 2). In the present invention, the flex head gimbal assembly 34 is formed from a polymeric material. In essence, the assembly 34 replaces the load beam 24, slider 12 and gimbal 28 in FIGS. 1 and 2). Assembly 34 includes an attachment area 36, a flexure portion 38, and an integrated gimbal 40. The attachment area 36 includes solder bumps 42 connected via electrical leads 44 to the flex cable 46, which is disposed along the length of the assembly 34. The flexure portion 38 includes the flex cable 46 and electrical interconnections 48. A thick and stiff plate 50 is disposed between the flexure portion 38 and the attachment portion 36 on the substrate 52. The integrated gimbal 40 includes electrical leads 54 extending from the electrical interconnections 48 of the flexure portion to the slider 56 (shown in phantom).

Generally, the solder bumps 42 provide both the mechanical and the electrical attachment between the actuator arm 20 and the assembly 34. In the prior art, the bond between the actuator arm 20 and the load beam 24 was independent of the electrical connection, thereby requiring two independent assembly steps. In the present invention, by using the solder bumps 42 to establish both the mechanical bond and the electrical connection between the actuator arm 20 and the assembly 34, the assembly process is simplified. Additionally, since the leads 44 can be etched onto the assembly 34, no additional wires are required to establish the electrical connection, thereby reducing the number of parts required used in the head gimbal assembly 34. Moreover, by reducing the number of parts, the overall weight of the assembly 34 is reduced, which can improve overall resonance in the system.

Stiff (and thick) plate 50 replaces the formed bend region of the prior art suspension. The stiff plate 50 may be bonded or deposited onto the substrate 52 of the assembly 34. The stiff plate 50 is then bent to set the attitude or orientation of the assembly 34, and specifically to set the attitude or orientation of the flexure portion 38 of the assembly 34. In essence, the stiff plate 50 becomes the load beam and the flexure portion 38 creates and delivers the pre-load. By deforming the stiff plate 50 (as shown as 50' in FIG. 5) to achieve the desired z-height (and orientation), the loading of the read/write head onto the disc causes the flexure portion 38 to impart the desired pre-load.

Generally, the stiff plate 50 is positioned in a bend region of the substrate 52 (between the attachment area 36 and the flexure portion 38). The stiff plate 50 can be formed from the same material as the substrate 52 or from a different material. Specifically, the stiff plate 50 can be formed from polymeric material (such as polyamide), from metal, from glass, or from any other material that is strong enough to maintain a bend formed in the underlying substrate 52. Generally, the thickness and material properties of the substrate 52 determine the requirements for the stiff plate 50 to maintain a bend in the substrate 52. In some instances, it is possible to maintain the bend of the substrate 52 simply by depositing a plate of the same material as the underlying substrate. In this instance, the stiff plate 50 would be a location along the substrate having a greater relative thickness than the rest of the substrate 52. In other instances, the stiff plate 50 may be formed of a different material, such as a metal. Regardless of the material used to form the stiff plate 50, the relative thickness of the assembly 34 at the location of the stiff plate 50 is greater than the thickness of the substrate 52 by itself.

It will be understood by a worker skilled in the art that the thickness of the stiff plate 50 depends on the stiffness of the substrate 52 and on the material selected to form the stiff plate 50. Additionally, it will be understood by a worker skilled in the art that the stiff plate 50 must be sufficiently thick and stiff to maintain the bend in the underlying substrate 52. Moreover, it will be understood that the stiff plate 50 can be extended into either the attachment region 36 or the flexure portion 38 to further strengthen the substrate 52, provided the stiff plate is symmetric about a longitudinal axis of the assembly 34. Generally, the stiff plate 50 may be of any thickness and may be formed from any material provided the stiff plate 50 is deformable to bend the substrate 52 to the appropriate z-height, and provided the stiff plate 50 is sufficiently thick and stiff to maintain the bend in the substrate 52

In the embodiment shown in FIG. 3, the stiff plate 50 is formed from stainless steel deposited in the bend region on a polyimide substrate 52. The stainless steel plate 50 is deposited to a thickness sufficient to allow bending of the stiff plate 50 without cracking the plate. Additionally, the thick plate 50 is deposited over sufficient surface area of the substrate 52 and to sufficient thickness relative to the thickness of the substrate 52 to maintain a bend, so that the stiff plate 50 can hold the substrate 52 at the desired z-height.

By delivering the pre-load via the flexure portion 38, the present invention simplifies the assembly 34 over previous structures. Specifically, stiffening rails along the length of the flexure and various other elements are eliminated. Since the entire structure of the assembly 34 is formed from a polymeric material, the entire assembly 34 can be made very cost effective. Moreover, the stiffening plate 50 can be added only in the bend region, allowing the polymeric flexure portion 38 to deliver the pre-load directly.

Finally, electrical leads 54 connect the flexure portion 38 to the integrated gimbal 40, which, in turn, is electrically connected to the read/write head via the slider 56 (shown in phantom).

FIG. 4 illustrates a side view of the flex head gimbal assembly 34 of the present invention prior to z-height formation. As shown, the attachment portion 36 includes solder bumps 42. Between the attachment portion 36 and the flexure portion 38, the stiff plate 50 is deposited on the substrate 52. Integrated gimbal 40 is shown with the attached slider 56.

FIG. 5 illustrates a side view of the flex head gimbal assembly 34 of the present invention after z-height formation. As shown, between the attachment portion 36 and the flexure portion 38, the stiff plate 50' is bent, setting the desired z-height and orientation of the assembly 34, and specifically the orientation of the flexure portion 38, which creates the pre-load. Subsequent loading of the read/write head on the slider 56 over the rotating disc 16 of the disc drive 10 imparts a pre-load onto the flexure portion 38.

Figure 6:
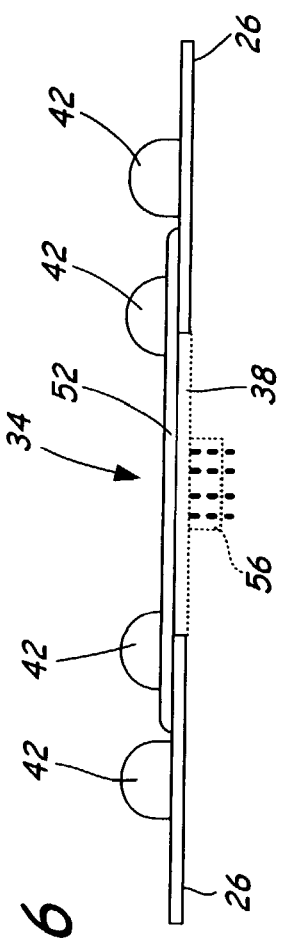
FIG. 6 is a rear view of the electrical/mechanical attachment between the load beam of FIG. 3 and the actuator arm.

FIG. 6 illustrates a side view of the attachment between the actuator arm 20 and the flex head gimbal assembly 34 of the present invention. The flexure portion 38 is shown in phantom as is the attached slider 56. The solder bumps 42 provide both the electrical and the mechanical connection between the arm 20 and the assembly 34, reducing the number of assembly steps and the number of parts, thereby simplifying the assembly process and reducing the overall costs of production.

Generally, the invention is designed to work with any existing disc drive system; however, the assembly 34 is designed to work with arms 20 having integrated circuitry. The assembly 34 is specifically designed to work with actuator arms 20 made from printed circuit boards (PCB) for low cost manufacture and assembly and for electronics integration. The solder bumps at the "swaging" area (i.e. the attachment portion 36) assure both the mechanical attachment and the electrical interconnection.

While the stiff plate 50 has been illustrated to extend only a small portion of the substrate, the plate 50 can be extended into the attachment portion 36 to strengthen the attachment portion 36.

The solder bumps 42 can be integrated easily with conventional suspension designs by extending the flexure portion 38 to the base plate 26 of the conventional actuator arm 20 and by securing the flexure portion 38 directly to the base plate 26 using an adhesive. The solder bumps will then secure both mechanically and electrically the head gimbal assembly 34 to the arm 20. The arm 20 can be formed of PCB as in the case of a Jackson drive or of conventional metal designs with electrical interconnects.

Generally, the substrate 52 can be formed of a polymeric material, specifically a polyimide material. By producing the substrate using polyimide materials, the overall costs of the production are reduced significantly. The stiff plate 50 can be formed of the same or of different material from the substrate 52. The stiff plate 50 increases the thickness of the substrate 52. The thickness of the stiff plate 50 can be varied according to the bending characteristics of the substrate 52. In other words, if the substrate material does not bend easily, the thickness of the stiff plate 50 can be adjusted as needed during manufacturing to impart the permanent z-height on the substrate material.

In the instant invention, the substrate 52 can be formed and etched to establish the electrical interconnections 48 and the flex cable 46 on a flat surface. The stiff plate 50 can be bonded or deposited at the same time or at a later time onto the flat substrate 52. The substrate 52 can then be bent in the area of the stiff plate 50, such that the stiff plate 50 maintains the bend, holding the flexure portion 38 and the integrated gimbal 40 at a permanent z-height, and at the appropriate orientation. The flexure portion 38 delivers the pre-load. Finally, the electrical and mechanical connection between the assembly 34 and the actuator arm 20 can be formed with a single soldering process, simplifying the assembly process and eliminating unnecessary wires.

Although the present invention has been described with reference to preferred embodiments, workers skilled in the art will recognize that changes may be made in form and detail without departing from the spirit and scope of the invention.

The invention claimed is:

1. An assembly for mechanically and electrically linking an actuator arm with a slider supporting a read/write head proximate a rotating disc, the slider positioned on a gimbal, the assembly comprising:
    a polymeric substrate having an attachment region, a flexure region and a gimbal, the substrate having a flex cable and electrical interconnections defined on a surface and extending from the attachment region across the flexure region and onto the gimbal of the substrate;
    solder bumps disposed in the attachment region for mechanically attaching the substrate to the actuator arm; and
    electrical leads extending from the solder bumps to the flex cable to connect electrically the substrate to the actuator arm.

2. The assembly of claim 1, wherein the gimbal of the substrate is integrated with the flexure region such that the assembly is fabricated from the same piece of material.

3. The assembly of claim 1, further comprising:
    a thick and stiff plate disposed on the substrate between the attachment region and the flexure region.

4. The assembly of claim 3, wherein the thick and stiff plate is deposited during fabrication of the flex cable.

5. An assembly comprising:
    an actuator arm having electrical leads;
    a load arm having integrated circuitry, the load arm comprising a polymeric substrate having an attachment region, a flexure region without stiffening rails along its length and a gimbal;
    a slider supporting a read/write head proximate a rotating disc, the slider positioned on the gimbal;
    solder bumps disposed on the load arm for attaching mechanically and electrically the electrical leads of the actuator arm to the integrated circuitry of the load arm; and
    a thick and stiff plate disposed on the load arm to impart a z-height stiffness to a substrate such that the substrate delivers a preload.

6. The assembly of claim 5, wherein the thick and stiff plate is deposited during fabrication of a flex cable.

7. An assembly comprising:
    an actuator arm;
    a suspension comprising a polymeric substrate having an attachment region, a flexure region and a gimbal;
    a flex cable and electrical interconnections on a first surface of the substrate, the flex cable extending from the attachment region to the gimbal;
    a stiff plate on the substrate between the attachment region and the flexure region;
    a slider connected to the gimbal; and
    solder bumps on the first surface in the attachment region for attaching the suspension to the actuator arm at the attachment region.

8. The assembly of claim 7 wherein a preload is delivered by the stiff plate.

9. The assembly of claim 7, wherein the suspension is a polyimide material.

10. An assembly comprising:
    an actuator arm;
    a suspension comprising a polymeric substrate having an attachment region, a flexure region without stiffening rails along its length, and a gimbal;
    a flex cable and electrical interconnections on a first surface of the suspension, the flex cable extending from the attachment region to the gimbal;
    a stiff plate on the suspension and having a transverse bend at a junction of the attachment region and the flexure region that imparts a preload to the flexure region;
    a slider connected to the gimbal; and
    solder bumps on the first surface of the suspension in the attachment region for connecting the suspension to the actuator arm electrically and mechanically, the solder bumps being electrically connected to the flex cable.

* * * * *